United States Patent
Ishikawa (10) Patent No.: US 7,364,373 B2
(45) Date of Patent: Apr. 29, 2008

(54) OPTICAL TRANSCEIVER CONSISTENTLY SATISFYING OPTICAL ALIGNMENT AND HEAT-DISSIPATION

(75) Inventor: Manabu Ishikawa, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/606,362

(22) Filed: Nov. 30, 2006

(65) Prior Publication Data

US 2007/0133930 A1 Jun. 14, 2007

Related U.S. Application Data

(60) Provisional application No. 60/741,080, filed on Dec. 1, 2005.

(51) Int. Cl.
*G02B 6/36* (2006.01)
(52) U.S. Cl. .......................................... 385/92; 385/89
(58) Field of Classification Search .................. 385/14, 385/49, 88–94
See application file for complete search history.

(56) References Cited

U.S. PATENT DOCUMENTS 7,280,724 B2 * 10/2007 Yoshikawa .................... 385/52
7,287,916 B2 * 10/2007 Mizue ........................... 385/92
2005/0180754 A1 8/2005 Mizue et al.
2006/0204183 A1 9/2006 Ishikawa

FOREIGN PATENT DOCUMENTS

JP 2005-227783 A 8/2005
JP 2006-259720 A 9/2006

\* cited by examiner

*Primary Examiner*—Hemang Sanghavi
(74) *Attorney, Agent, or Firm*—Venable LLP; Michael A. Sartori

(57) ABSTRACT

The present invention provides an optical transceiver with a structure that is able to cope with both the heat-dissipation and the optical coupling of the sub-assembly with a butterfly package. The optical transceiver includes a frame, a receptacle member, a transmitter optical sub-assembly, a receiver optical sub-assembly, a substrate and a cover. At least one of sub-assemblies provides, what is called, a butterfly package assembled with the receptacle member. The assembly of the receptacle member with the sub-assembly is fixed to the frame with an elastomer put between the receptacle member and the frame. The sub-assembly is assembled with the receptacle member as satisfying the optical alignment, while, the assembly of the receptacle member and the sub-assembly is fixed to the frame in a unit. Accordingly, the optical alignment and the fixing to the frame are consistently satisfied.

11 Claims, 8 Drawing Sheets

FIG. 8

OPTICAL TRANSCEIVER CONSISTENTLY SATISFYING OPTICAL ALIGNMENT AND HEAT-DISSIPATION

CROSS-REFERENCE TO RELATED APPLICATION

This application claims the benefit of U.S. Provisional Application No. 60/741,080, titled "Optical transceiver" filed Dec. 1, 2005, which is incorporated herein by a reference.

SUMMARY OF THE INVENTION

1. Field of the Invention

The present invention relates to an optical transceiver, in particular, the invention relates to a new arrangement of an optical transceiver installing a sub-assembly with, what is called, a butterfly package.

2. Related Prior Art

The optical transceiver includes a transmitter optical sub-assembly (TOSA), a receiver optical sub-assembly (ROSA), a substrate mounting an electronic circuit coupled with the TOSA and the ROSA to process electrical signals, and a frame for mounting the substrate. The electronic circuits are, for instance, a driver for driving a laser diode installed within the TOSA, a signal re-generator for amplifying an electrical signal converted by a photodiode installed within the ROSA and extracting a clock and a data contained in the received optical signal, and a circuit for controlling the driver and the re-generator.

Figure 1:
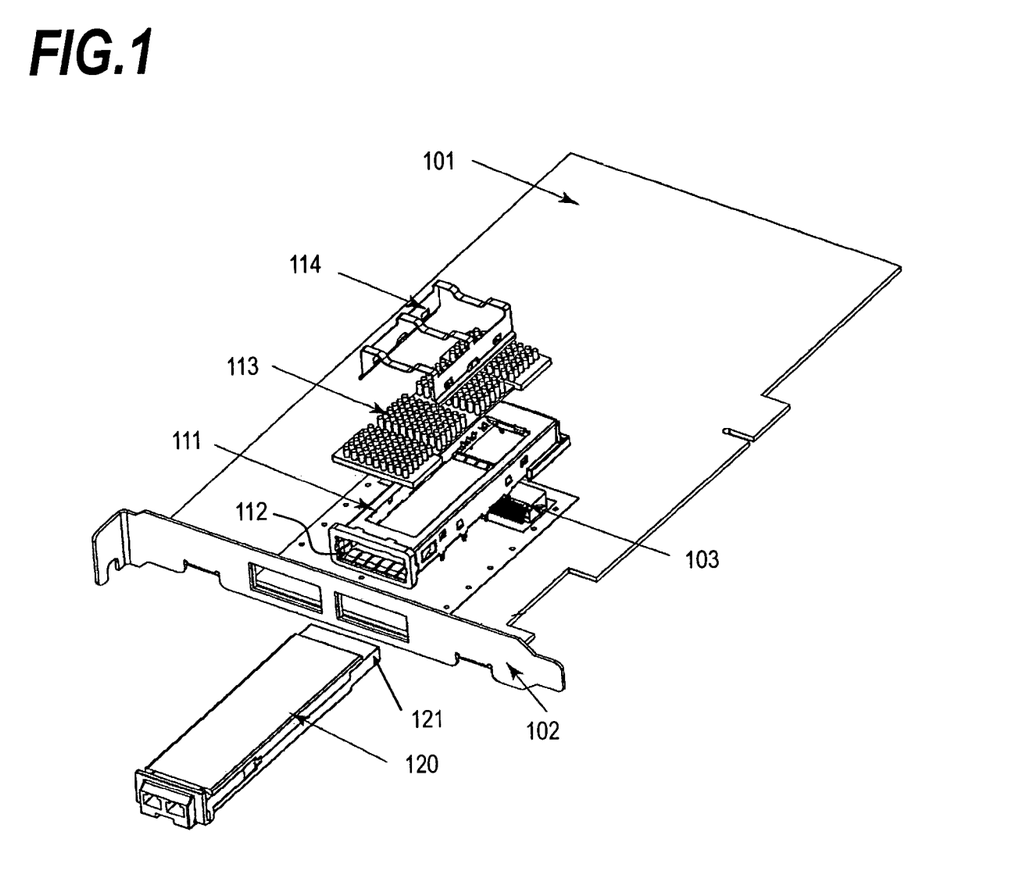
FIG. 1 is a partially broken perspective view showing the pluggable optical transceiver and the host board installing the pluggable optical transceiver.

Recently, the specification of such optical transceiver, in particular, outer dimensions and electrical functions, becomes common in the market by defining, what is called, a multi-source agreement (MSA) to make the replacement of the transceiver possible even when the vendor or the manufacturer thereof is different. One of such MSA is the XFP standard, which is the 10 Gbps small form factor pluggable module multi-source agreement and set in Apr. 2, 2003. FIG. 1 is a perspective view showing the XFP transceiver mounted on the host board. The host board provides a metal cage 111 thereon. The aperture 112 of the cage exposes in the bezel 102, into which the optical transceiver 120 is inserted. In the rear end of the optical transceiver 120 is provided with an electrical plug 121. By engaging this electrical plug 121 with an electrical connector 103 provided in the deep end of the cage 111, an electrical communication, for instance, the transmitting of electrical signals and the providing power supplies, between the transceiver 120 and the host 101 can be realized. On the upper surface of the cage 111 is sometimes attached with a heat-radiating fin 113 with a clip 114.

Various inner structures of the optical transceiver are well known and proposed in such MSAs. The conventional optical transceiver generally uses sub-assemblies with, what is called, a co-axial package. Because, the transmission rate is limited within a few giga-bit per seconds (Gbps) and the power consumption of the electronic components is not so large. To conduct the heat from the electronic components by adhering thermal sheets inserting between the components and the frame of the transceiver may effectively dissipate heat to maintain the performance of the electronic components and the semiconductor optical devices installed therein.

However, recent transmission rate reaches 10 Gbps or more. The power consumption by the electronic devices becomes quite large to be operable in such high frequency. Further one modified application is proposed that such pluggable transceiver is applied in the wavelength division multiplexed (WDM) communication that precisely defines the wavelengths of optical signals. Thus, the optical transceiver is inevitable to install a temperature controlling device to precisely control and maintain the emission wavelength of the laser diode installed within the sub-assembly. The conventional co-axial package for the TOSA is hard to install such temperature controlling device therein from a viewpoint of the package size. Accordingly, the butterfly package with a rectangular shape is applied to such a functional optical transceiver. For the ROSA, the situation of the increasing the heat generation is similar to those confronted for the TOSA. The butterfly package is also sometimes inevitable for the ROSA.

The butterfly package brings an inconsistent subject. That is, a primary object to apply the butterfly package is to install a component that generates large heat, accordingly, the outer surface of the butterfly package is necessary to be adhered to somewhere to effectively conduct heat generated within the package.

Figure 2:
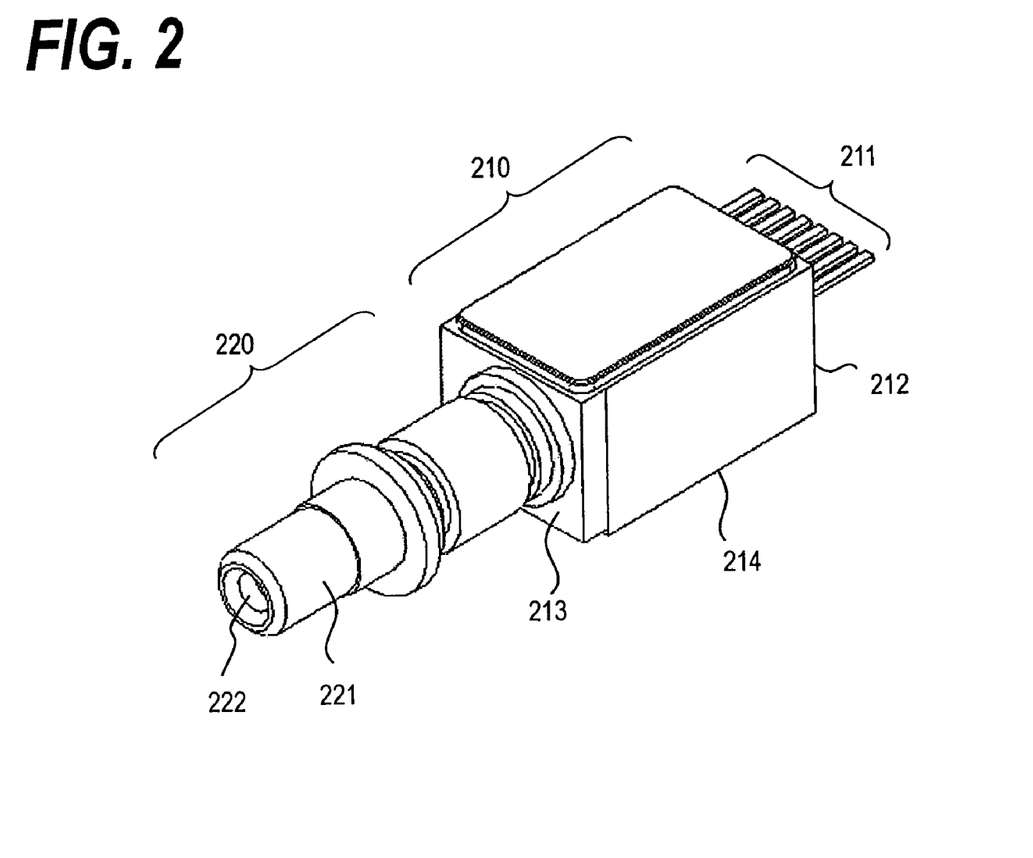
FIG. 2 is a perspective view showing the sub-assembly with a butterfly package.

FIG. 2 is a perspective view showing the sub-assembly with the butterfly package. The sub-assembly includes a body portion 210 with a rectangular shape and a sleeve portion 220. A plurality of lead terminals 211 extrudes from rear side wall 212 of the body portion 210. The sleeve portion 220 extrudes from a side 213 opposite to the side wall 212 and a tip thereof provides a sleeve 221. This sleeve 221 receives a ferrule, which is not shown in FIG. 2, and an optical fiber held in a center of the ferrule optically couples with an optical device installed within the body portion 210. The optical device is optically aligned with the center of the aperture 222 of the sleeve 221. In the sub-assembly shown in FIG. 2, the bottom 214 of the body portion 210 is necessary to be adhered to the frame of the transceiver to conduct heat generated by components installed within the body portion 210.

On the other hand, to optically couple the optical device with the optical fiber, in other words, to optically align the sleeve with the optical fiber, the sleeve 221 is necessary to be positioned with respect to the optical receptacle that is a part of the frame of the transceiver. By mating the optical plug, which contains the ferrule, with the optical receptacle in the transceiver, which mates the ferrule in the optical plug with the sleeve, the optical device in the body portion 210 can optically couple with the optical fiber in the ferrule. In FIG. 1, two apertures illustrated in the end portion of the optical transceiver 120 correspond to the optical receptacle for the transmitter and the receiver, respectively.

Thus, in the butterfly package, the bottom of the body portion is necessary to be adhered to the frame and, at the same time, the sleeve is necessary to be defined in the position thereof with respect to the frame to optically couple with the optical plug. However, some tolerance in physical dimensions is inevitably attributed to such mechanical components. The conventional sub-assemblies with the co-axial package have solved the subject of the heat dissipation by interposing a thermal sheet made of elastic resin between the sub-assembly and the frame. The elasticity of the resin may compensate the tolerance; accordingly, the positional relationship against the frame is determined primarily by the optical coupling of the sub-assembly with the optical fiber. However, the sub-assembly with the butterfly package is necessary to enhance the heat dissipating efficiency compared to that of the co-axial package, accordingly, the bottom surface of the butterfly package must be adhered to the frame, which becomes unable for the thermal sheet to compensate the mechanical tolerance. For the butterfly package, it is required to define the positional relationship against the frame by two points, namely, the sleeve portion and the bottom of the body portion of the package, which induces a mechanical stress at the connecting point of the sleeve portion with the body portion of the package.

A Japanese patent application published as JP-2005-227783A has disclosed a structure of the optical transceiver, in which the sub-assembly is adhered to the bottom surface thereof to the frame of the transceiver after the sleeve of the sub-assembly is optically aligned with the optical receptacle. Another Japanese patent application published as JP-2006-259720A has disclosed a similar structure of the optical transceiver, in which the sleeve is first aligned with the receptacle and the bottom of the sub-assembly is next adhered to the frame by rotating the assembly of the optical receptacle with the sub-assembly around the longitudinal axis of the optical transceiver by dividing the optical receptacle from the frame.

Thus, an aspect of the present invention is to provide a simple structure of the optical transceiver that, dividing the optical receptacle and the frame of the transceiver, assembles the unit integrating the optical receptacle with the sub-assemblies with the frame.

SUMMARY OF THE INVENTION

The optical transceiver according to the present invention comprises a receptacle member, sub-assemblies, and a frame. The receptacle member includes an optical receptacle that mates with an optical connector. The sub-assemblies each installs a semiconductor optical device that optically couples with the optical fiber secured in the optical connector by being assembled with the receptacle member. The frame installs the receptacle member and the sub-assemblies. At least one sub-assembly provides, what is called, a butterfly package with a rectangular body portion installing the semiconductor optical device and a cylindrical sleeve portion extending from one side wall of the body portion. The receptacle member includes a first portion that includes the optical receptacle and a second portion that continues to the first portion and provides openings to receive the sleeve portion of the sub-assemblies. The present invention has a feature that the receptacle member is fixed to the frame by putting a resin member, typically an elastomer, between the receptacle member and the frame at the second portion. Moreover, the frame of the transceiver according to the present invention puts the receptacle member between side walls of the frame, and the side walls each provides a groove in an inner surface thereof, while, the outer side surface of the side wall of the receptacle member provides a projection to be mated with the groove of the side wall of the frame. The receptacle member with the sub-assemblies integrated therewith may be movable between the side walls of the frame by sliding the projection of the outer side surface within the groove of the inner surface of the side wall of the frame.

DESCRIPTION OF PREFERRED EMBODIMENTS

Figure 3:
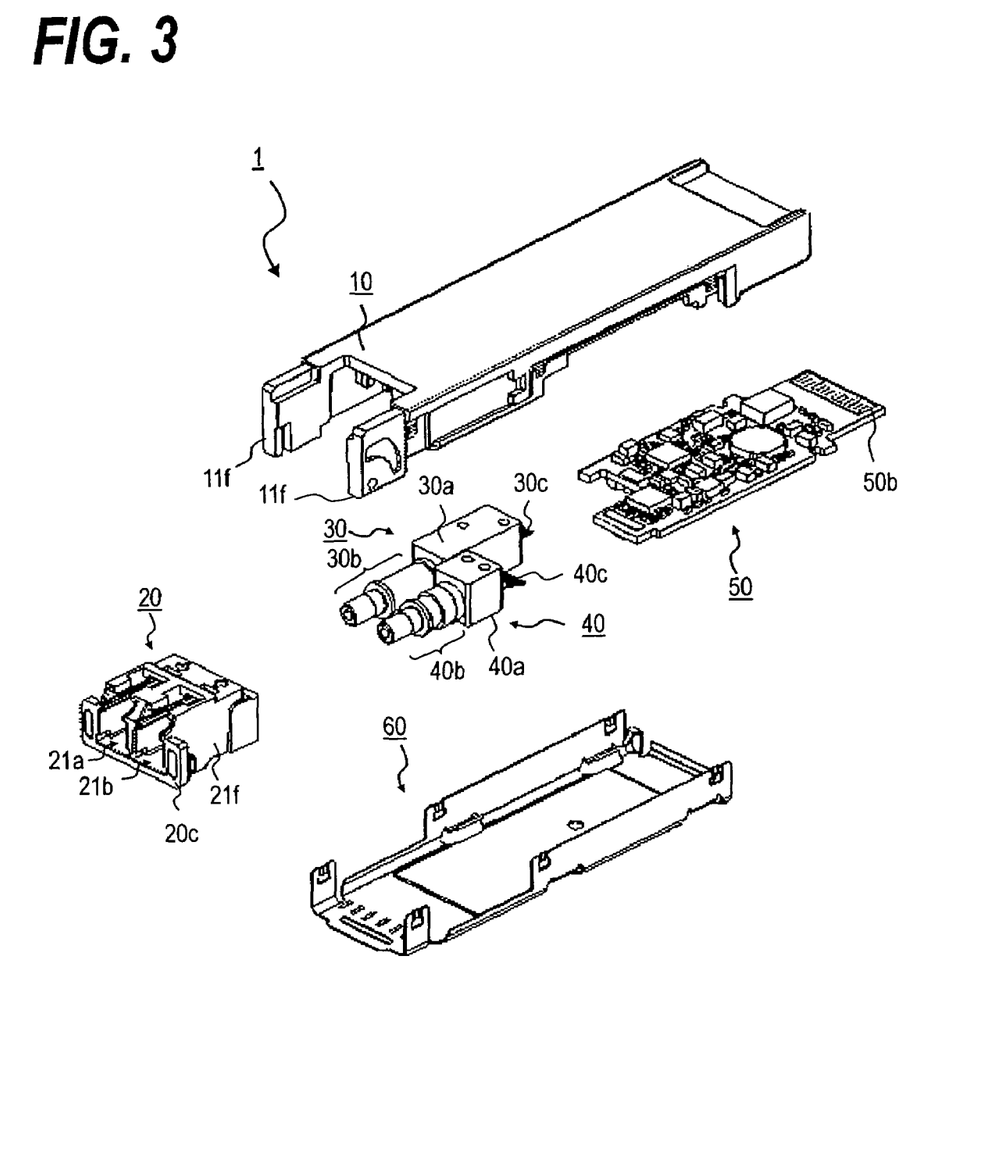
FIG. 3 is an exploded view of the optical transceiver according to an embodiment of the present invention.

FIG. 3 is an exploded view of an optical transceiver according to the present invention. The optical transceiver 1 primarily comprises a frame 10, a substrate 50, a transmitter optical sub-assembly (TOSA) 30, a receiver optical sub-assembly (ROSA) 40, a receptacle member 20, and a cover 60. Since the transceiver shown in FIG. 1 provides both the TOSA 30 and the ROSA 40 each able to couple with the optical fiber independently, an optical communication can be realized in the full-duplex mode. Although FIG. 3 illustrates the ROSA 40 with a box shaped package, functions and advantages of the present invention are independent of the shape of the package of the ROSA 40 as described below.

The frame 10 is made by aluminum die-casting and mounts the receptacle member 20, the TOSA 30, the ROSA 40, and the substrate 50 from the front side thereof to the rear side in this order. The frame 10 further assembles with the cover 60 to enclose the TOSA 30, the ROSA 40 and the substrate 50. The front corresponds to a side where the receptacle member 20 is provided, while, the rear corresponds to a side where a plug connector 50b is formed on the substrate. The frame 10 covers sides of the receptacle member 20 in the front side and extends to the front end of the transceiver 10 to abut the front surface 11f of the frame 10 against the flange 20c of the receptacle member 20.

The receptacle member 20 is made of resin plated with metal or metal alloy including a die-casting zinc alloy. The front side of the receptacle member 20 provides an optical receptacle with two openings, 21a and 21b. Although not explicitly shown in FIG. 3, the receptacle member 20 forms openings in the rear wall thereof into which sleeves, 30b and 40b, of the optical sub-assemblies, 30 and 40, are inserted. By inserting the sleeve of the optical sub-assembly into the opening, the position of the sleeve can be determined within the optical receptacle, accordingly, the optical devices installed within the body portion, 30a and 40a, may optically couple with the optical fibers secured in the optical connector to be mated with the optical receptacle, 21a and 21b.

Two sub-assemblies, 30 and 40, provide butterfly packages with body portions, 30a and 40a, with a rectangular shape and cylindrical sleeve portions, 30b and 40b, extruding from one side wall of the body portion. At least a portion coming in contact with the body portion, 30a or 40a, of the sleeve portion, 30b or 40b, is necessary to be made of metal, while, other portions, namely, tip portions of the sleeve, 30b or 40b, may be made of metal or resin. A plurality of lead terminals for the electrical signal, 30c or 40c, protrude from the rear wall of the body portions, 30a or 40a. Although not explicitly illustrated in FIG. 3, the TOSA 30 further provides other lead terminals protruding from one side wall thereof with a flexible printed circuit (FPC) board to electrically connect the lead terminals to the circuit board. Interconnections formed on the FPC board are provided for the low-frequency or DC signals, such as the power supply line to the thermo-electric device installed within the TOSA 30 and the signal from the temperature sensor.

The substrate 50 mounts an electronic circuit thereon. The circuits for the TOSA 30 are an LD driver circuit for driving the semiconductor laser diode (LD) installed within the body portion 30a, a temperature controller to control the temperature of the thermo-electric cooler also within the body portion 30a, and an auto-power controller (APC) to keep the optical output power of the LD. On the other hand, the circuits for the ROSA 40 are a main amplifier to amplify a signal output from the ROSA 40, a clock extractor to extract the clock component from the amplified signal, and a data re-generator to extract the data component from the amplified signal based on the extracted clock. When the ROSA 40 installs an avalanche photodiode (APD) as a light-receiving device, a bias controlling circuit for this APD may be mounted on the substrate 50. On the rear end of the substrate 50 is provided with the plug connector 50b to be mated with the connector within the cage. A hot pluggable function, namely, the transceiver may be inserted into or extracted from the cage without shutting down the host system, can be obtained by forming the electrode pattern on the substrate in a predetermined shape.

The cover, made of metal plate, electrically shields the sub-assemblies, 30 and 40, and the substrate 50 by enclosing these parts between the frame 10. A portion of the side wall of the cover 60 provides a cut to expose the latching lever therefrom to latch the transceiver 1 with the cage.

Next, details of the members mentioned above will be described.

(Receptacle Member)

Figure 4A:
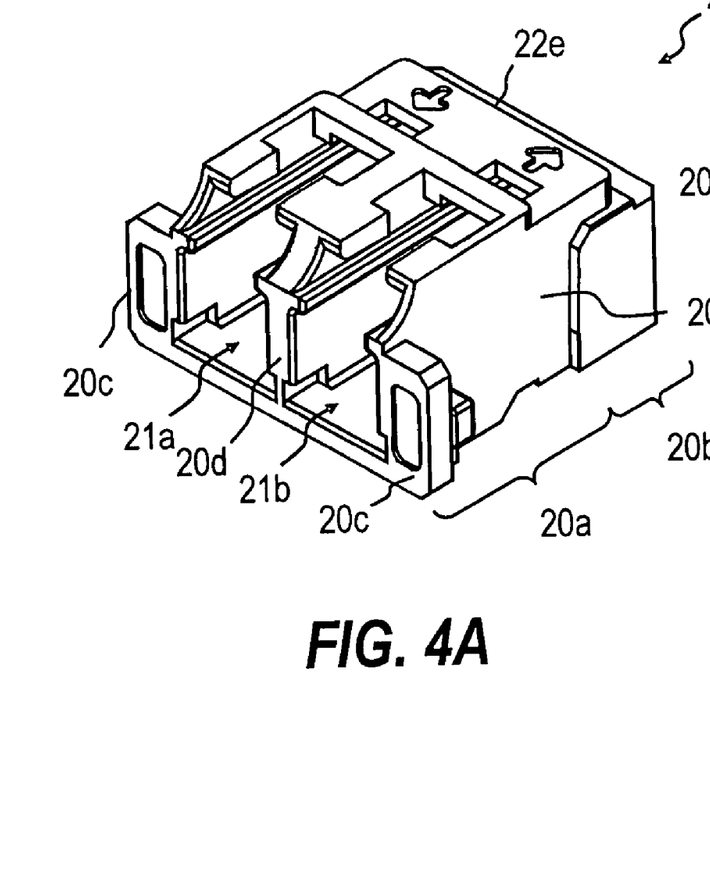
FIGS. 4A and 4B are perspective drawings of the receptacle member according to the present invention, which are viewed from different directions.
Figure 4B:
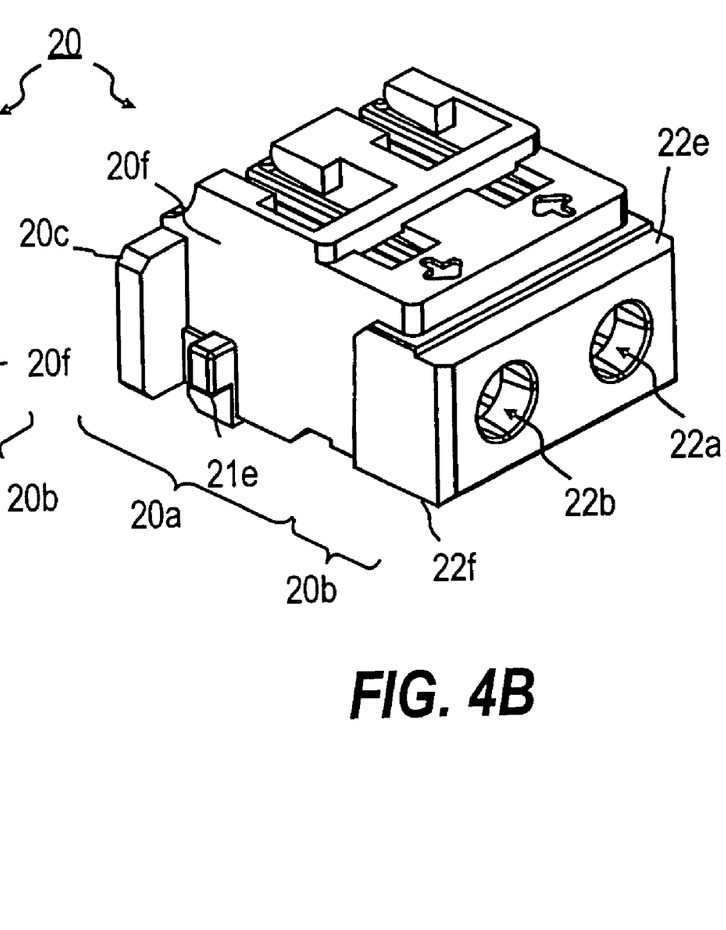

FIGS. 4A and 4B are perspective drawings viewed from the front upper side and the rear upper side, respectively. The receptacle member 20, made of resin plated with electrically conducting material in a whole surface thereof, includes a first portion 20a forming the optical receptacles, 21a and 21b, and a second portion 20b with the rear wall that forms two openings, 22a and 22b, into which the sleeve portions, 30b and 40b, of the sub-assemblies, 30 and 40, are inserted.

The first portion 20a is divided by the center partition 20d to form the optical receptacle 21a for the transmission and 'that 21b for the reception. Physical dimensions of the optical receptacles, 21a and 21b, are precisely defined by the specification of the optical connector to be mated with these optical receptacles. Both side walls of the front end of the first portion 20a form flanges 20c to define the front end of the optical transceiver 1. Both side walls secluded from the flange 20c forms projections 21e to mate the receptacle member 20 with the frame 10. To put the receptacle member 20 between the front walls 11f of the frame 10 and to fit these projections 21e in the grooves 11a formed in the inner surface 11f of the frame, which abuts the front end surface of the frame 10 against the rear surface of the flange 20c, determines the position of the receptacle member 20 in the longitudinal direction. The projection 21e may slide within the groove 11a, which enables an assembly of the sub-assemblies, 30 and 40, with the receptacle member 20 to be fixed with the frame 10 as maintaining the optical coupling between the receptacle member 20 with the sub-assemblies, 30 and 40.

The second portion 20b provides two openings, 22a and 22b, into which the sleeve portions, 30b and 40b, of the sub-assemblies, 30 and 40 are inserted. By setting the diameter of the openings, 22a and 22b, slightly smaller than the outer diameter of the sleeve portions, 30b and 40b, the sleeve portions can be automatically determined in their position within each optical receptacle, 21a or 21b, without any backlash. That is, the sleeve portions, 30b and 40b, in tips thereof does not move in wobbling. The second portion 20b also forms a step 22e with 0.3 mm height and 1.5 mm depth in the upper end portion thereof. Although not illustrated in FIGS. 4A and 4B, an elastomer is applied along this step 22e with a thickness of about 0.5 mm. This elastomer operates as an elastic member when the receptacle member 20 with the sub-assemblies, 30 and 40, are set on the frame 10 such that the bottom of the body portions, 30a and 40a, of the sub-assemblies are adhered to the corresponding position on the frame 10, which absorbs the mechanical deformation induced between the sleeve portions, 30b and 40b, and the body portions, 30a and 40a, that is left as a subject to be solved in conventional transceivers. The step 22e abuts against the surface 11b of the frame 10 when the receptacle member 20 is set between side walls 11f of the frame 10. Thus, in addition to the combination of the projection 20e and the groove 11a formed in the inner wall surface 11f of the frame 10, which is already explained, the step 22e abutting the front edge of the frame 10 determines the relative position of the receptacle member 20 with respect to the frame 10. Moreover, the electrically conductive elastomer may enhance the EMI shield characteristic of the transceiver 1.

Figure 6:
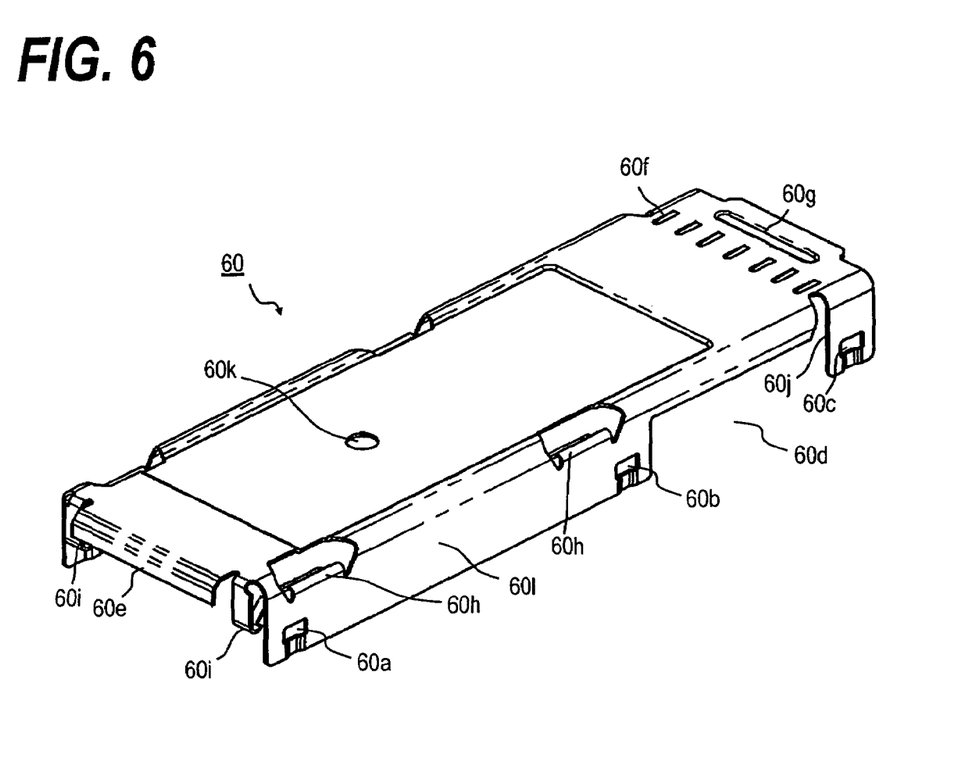
FIG. 6 is a perspective view of the cover of the optical transceiver according to an embodiment of the present invention.

The surface 22f opposite to the step 22e, which is the bottom side of the receptacle member 20, is formed in flat for the cover 60 to come in securely contact thereto. The tab 60f, which is illustrated in FIG. 6, comes in contact to this flat surface 20f to make the cover 60 in electrical contact to the receptacle member 20.

(Frame)

Figure 5:
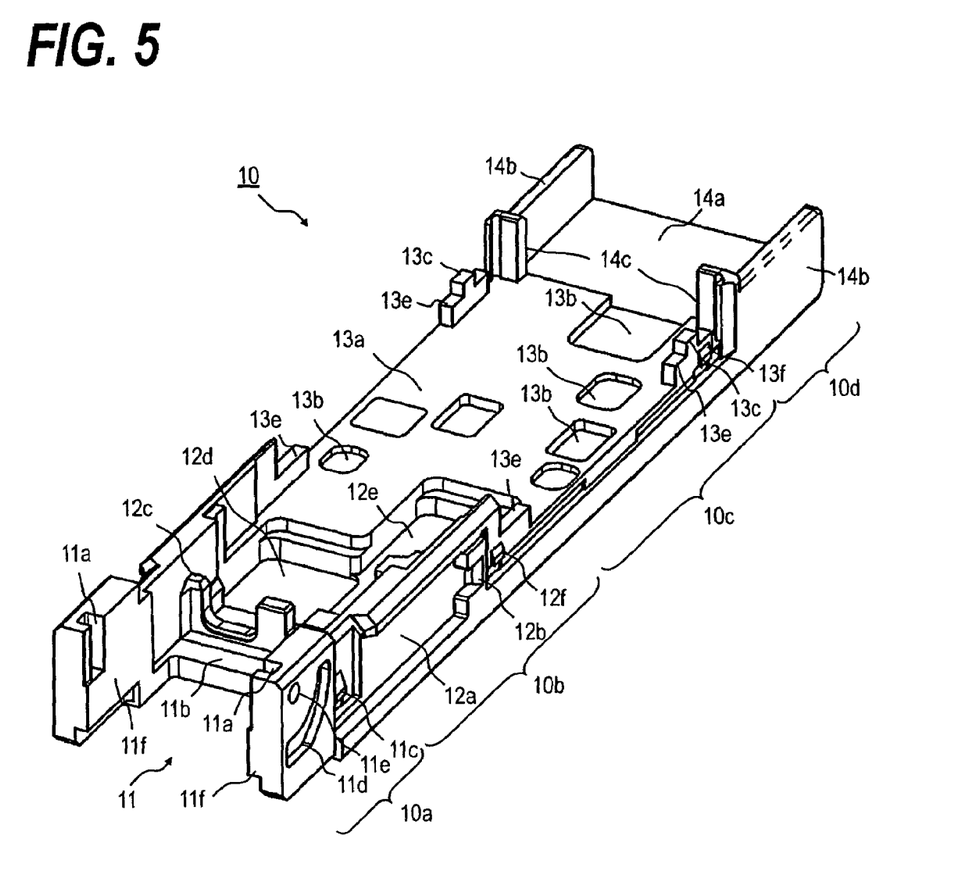
FIG. 5 is a perspective view of the frame according to an embodiment of the present invention.

FIG. 5 is a perspective drawing of the frame 10 viewed from the front side. The frame 10 includes first to fourth portions, 10a to 10d, from the front side in this order. The first to fourth portions, 10a to 10d, receive the receptacle member 20, two sub-assemblies, 30 and 40, the substrate 50, and the connector plug, respectively.

The first portion 10a provides a space 11 surrounded by two side walls 11f. As previously described, the inner surface of the side wall 11f forms the groove 11a to receive the projection 21e formed in the outer surface of the side wall 20f of the receptacle member 20. In the deep end of the space 11 is formed with the surface 11b to be abutted against the rear surface of the receptacle member 20. When the receptacle member 20 is assembled with the frame 10, the elastomer applied along the step 22e of the receptacle member 20 is to be abutted against this surface and compressed. Accordingly, the elastomer shows the elastic function. In the outer surface of the side walls 11f are formed with an opening 11e and a grove 11d, which are mechanisms to rotate the bail, not illustrated in FIG. 5, to release the engagement of the transceiver 1 with the cage.

In a border between the first and second portions, 10a and 10b, adjacent to the abutting surface 11b provided with the elastomer is formed with saddles 12c to hold the sub-assemblies, 30 and 40, although the saddle for the TOSA 30 is hidden by the side wall 11f. Moreover, two depressions, 12d and 12e, to receive the sub-assemblies, 30 and 40, are formed in adjacent to each saddle. In the present invention, since the receptacle member 20 provides the elastomer that has an elastic function, the stress maybe escaped from concentrating on the root of the sleeve portions, 30b and

40b, even the body portions, 30a and 40a, are pressed to the depressions, 12d and 12e. Other mechanisms, 12a and 12b, provided in the outer surface of the side wall of the second portion 10b are grooves for receiving the lever to release the latching the transceiver with the cage, which operates with the bail attached in the outer surface of the side wall 11f in the first portion 10a.

The third portion 10c installs the substrate 50. The third portion 10c provides a primary surface 13a, a plurality of depressions 13b gouged out the primary surface 13a, and a pair of projections 13c each formed in the sides thereof. The substrate 50 provides a pair of cuts in both sides thereof. By putting the substrate 50 on the step 13e as fitting the cuts in the substrate 50 with the projections 13c on the step 13e, the substrate 50 is positioned and fixed to the frame 10. Moreover, by abutting the front end of the substrate 50 against the rear end of both side walls in the second portion 10b, the longitudinal position of the substrate 50 may be determined. The depressions 13b receive the ICs mounted on the substrate 50. By putting thermal sheets within the depressions, a thickness of which may compensates the height of the step 13e, the depth of the depression 13b, and the thickness of the IC within the depression 13b, the heat-dissipating path from the IC to the frame 10 can be secured.

Between the third portion 10c and the fourth portion 10d is provided with a pair of posts 14c extending from the side walls in the fourth portion 10d. By abutting the finger 60i formed in the rear end of the cover 60 against this post 14c and pressing the substrate 50 with the tip of the finger 60i, the substrate 50 may be fixed to the frame 10. Moreover, the fourth portion 10d provides a flat portion 14a between both side walls 14b, which receives the plug connector 50b formed in the rear end of the substrate so as to be substantially in parallel with this flat surface.

(Cover)

FIG. 6 is a perspective view of the cover 60. The cover 60 is made of metal plate of stainless steel by the cutting and the bending. No welding or gluing is carried out. In FIG. 6, the right hand side corresponds to the front side of the transceiver 1. The side of the cover 60 is divided into two portions by the cut 60d. In the front side wall 60j is provided with an opening 60c to be fitted with the projection 11c formed in the outer surface of the side wall of the first portion 10a, while, the rear side wall 601 forms two openings, 60a and 60b, to be fitted with the projections, 12f and 13f, formed in the second 10b and third 10c portions of the frame 10. At the same time of the fittings, the finger 60h and another finger 60i formed in the rear end of the cover 60 press the substrate 60 against the frame 10. That is, the substrate 50 is not only mounted in the primary surface thereof on the step 13e but also pressed against the step 13e by the cover 60.

The bend 60e formed in the rear end of the cover 60 prevents the connector plug from miss-inserting into the connector in the cage by abutting the bend 60e against the front edge of the connector when the transceiver 1 is inserted into the cage in upside-down. The front portion of the cover 60 transversely forms a slit 60g to reinforce the mechanical strength of the cover 60. Moreover, the center opening 60k enables to observe the inside of the transceiver 1 after the completion of the assembly. A plurality of fingers 60f in the front side, as already explains, come in electrically contact with the receptacle member 20 to secure the ground potential of the receptacle member 20. That is, the finger 60f is formed by cutting U-shaped slits in the cover 60 and bending a portion inside this U-shaped slit inward. These fingers 60f may come in electrically contact with the surface 22f of the receptacle member 20 in plural points after the assembly of the cover 60 with the frame 10, which secures the electrical contact between the receptacle member 20 and the cover 60.

(Elastomer)

Figure 7:
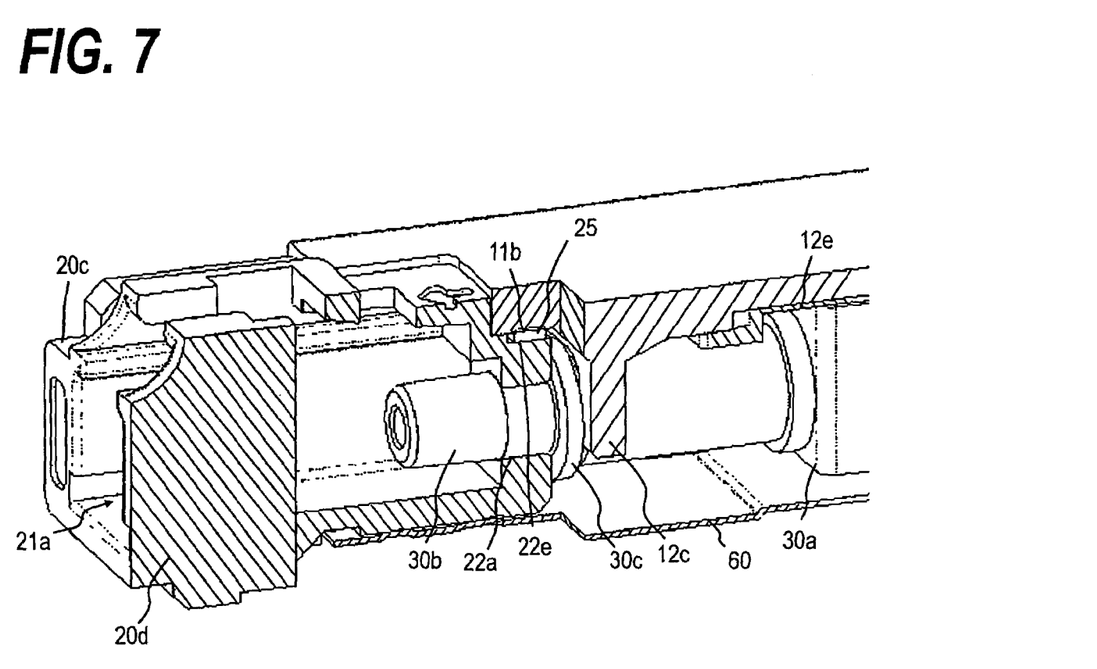
FIG. 7 is a partially broken perspective view showing the assembly of the receptacle member, the sub-assembly with the butterfly package and the frame.

FIG. 7 is a partially broken perspective view of the assembly of the TOSA 30 with the receptacle member 20 and the frame 10. The sleeve portion 30b of the TOSA 30 passes through the opening 22a in the second portion of the receptacle member 20. The body portion 30a of the TOSA is set within the depression 12e of the frame 10 as the bottom surface thereof comes in contact to the frame 10. The elastomer 25 is pressed between the step 22e of the receptacle member 20 and the flat surface 11b of the frame 10. According to the structure shown in FIG. 7, the sleeve 30b is precisely positioned with respect to the receptacle member 20 so as to satisfy the specification of the optical receptacle 21a. At the same time, the body portion 30a of the TOSA 30 is adhesively fixed to the depression 12e of the frame 10. Because the receptacle member 20 and the frame are independently to each other and the former member 20 is assembled with the latter member 10, so to speak, in a floating mode, the mechanical stress possibly caused between the sleeve portion 30b and the body portion 30a can be excaped. The floating mode can be realized by the elastomer 25 put between the frame 10 and the receptacle member 20.

The embodiment described above uses the elastomer 25 to realize the floating assembly between the frame 10 and the receptacle member 20. However, the present invention is not restricted to the elastomer. Any materials to have an elastic function may be applicable to the present invention. For instance, a leaf spring put between the frame 10 and the receptacle member 20 may show a similar function. Moreover, the receptacle member 20 may integrally build the leaf spring made of the same material with the receptacle member 20.

Figure 8:
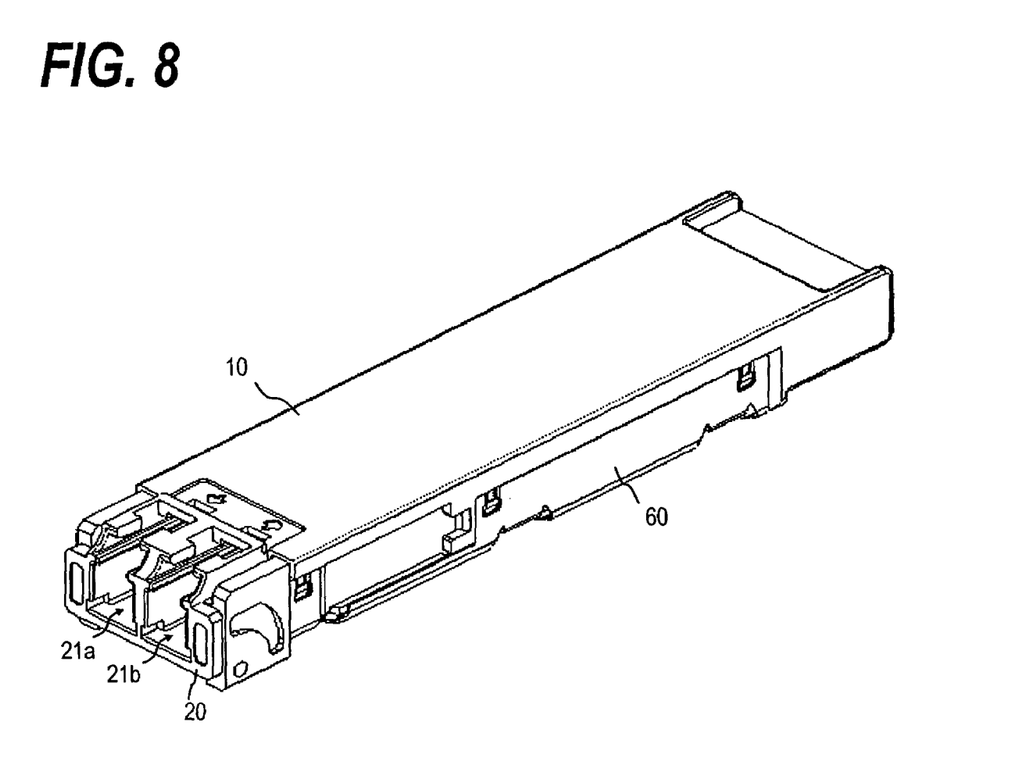
FIG. 8 is a perspective view of the optical transceiver after the completion of the assembly according to an embodiment of the invention.

FIG. 8 illustrates a completion of the optical transceiver 1 of the present invention. The while upper surface of the transceiver 1 expose the bottom of the frame 10. Accordingly, when the transceiver 1 is inserted into the cage with the heat dissipating fin, as shown in FIG. 1, the heat generated in the sub-assemblies, 30 and 40, and ICs mounted on the substrate 50 may be directly conducted to the cage. Since the sub-assemblies, 30 and 40, are installed on the frame 10 so as to adhere the bottom of the body portion thereof to the depression of the frame 10, which secures the effective heat-dissipating path from the sub-assemblies to the frame 10, and the bottom surface of the frame 10 directly comes in contact to the cage. Thus, the heat generated in the sub-assemblies, 30 and 40, may easily and effectively radiate outside the transceiver 1.

Further, since the frame is made of metal die-casting, even when the smooth insertion and the smooth extraction of the optical transceiver is not obtained due to the touching to the heat-dissipating fin of the cage, the transceiver, in particular, the substrate and the sub-assemblies, may be escaped from the mechanical deformation or damage. The optical transceiver according to the present invention may be assembled in all parts thereof by fitting, which can simplify the assembly to reduce the production cost.

What is claimed is:

1. An optical transceiver for optically communicating with an optical fiber secured within an optical connector engaged with the transceiver, comprising:

a receptacle member including first and second portions, the first portion mating with the optical connector, the second portion extending from the first portion and providing an opening;

an optical sub-assembly assembled with the receptacle member, the optical sub-assembly having a butterfly package with a rectangular body portion and a cylindrical sleeve portion extending from one side wall of the box portion, the cylindrical portion being fitted in the opening of the second portion of the receptacle member, the box portion installing a semiconductor optical device that optically couples with the optical fiber; and a frame for mounting the receptacle member and the optical sub-assembly, wherein the receptacle member assembled with the optical sub-assemblies is fixed to the frame by putting a resin between the second portion and the frame.

2. The optical transceiver according to claim 1, wherein the frame provides a pair of side walls each having a groove in an inner surface thereof, and the receptacle member provides a projection in each side surface of the first portion, wherein the projection is mated with the groove and slidable within the groove.

3. The optical transceiver according to claim 1, wherein the resin is an elastomer.

4. The optical transceiver according to claim 1, wherein the receptacle member is made of resin.

5. The optical transceiver according to claim 4, wherein the receptacle member is plated with an electrically conductive material.

6. The optical transceiver according to claim 1, wherein the receptacle member is made of metal alloy.

7. An optical transceiver for communicating with first and second optical fibers in a full-duplex mode, comprising:

a transmitter optical subassembly for transmitting a first optical signal to the first optical fibers, the transmitter optical subassembly having a cylindrical sleeve portion;

a receiver optical sub-assembly for receiving a second optical signal from the second optical fibers, the receiver optical subassembly having a cylindrical sleeve portion;

a receptacle member providing a pair of openings each receiving the cylindrical portion of the transmitter optical subassembly and the cylindrical portion of the receiver optical subassembly to build the transmitter optical subassembly and the receiver optical subassembly therewith, the receptacle member mating with an optical connector securing the first and second optical fibers; and frame for mounting the transmitter optical subassembly, the receiver optical subassembly and the receptacle member, wherein at least one of transmitter optical subassembly and the receiver optical subassembly provides a butterfly package with a rectangular body portion installing a semiconductor optical device optically coupled with one of first and second optical fibers, the cylindrical sleeve portion of at least one of the transmitter optical subassembly and the receiver optical subassembly extending from one side wall of the body portion, the body portion installing a semiconductor optical device optically coupled with the one of first and second optical fibers, the cylindrical portion being fitted in an opening formed in the receptacle member, and wherein the receptacle member that is built with the transmitter optical subassembly and the receiver optical subassembly is mounted on the frame by putting a resin between the receptacle member and the frame such that a bottom of the body portion is adhered to the frame and an optical coupling between the semiconductor optical device and one of the first and second optical fibers is maintained.

8. The optical transceiver according to claim 7, wherein the resin is made of elastomer.

9. The optical transceiver according to claim 7, wherein the receptacle member is made of resin plated with electrically conductive material.

10. The optical transceiver according to claim 7, wherein the receptacle member is made of die-casting metal alloy.

11. The optical transceiver according to claim 7, wherein the frame provides a pair of side walls each having a groove in an inner surface thereof, and the receptacle member provides a projection in each outer side surface of the first portion, wherein the projection is mated with the groove and slidable within the groove.

* * * * *